United States Patent [19]

Jewell et al.

[11] 4,304,527

[45] Dec. 8, 1981

[54] SYSTEM FOR PUMPING AN ABRASIVE OR CORROSIVE FLUID

[75] Inventors: Thomas J. Jewell, Padstow; John D. Webster, St. Austell, both of England

[73] Assignee: English Clays Lovering Pochin & Company Ltd., St. Austell, England

[21] Appl. No.: 29,014

[22] Filed: Apr. 11, 1979

Related U.S. Application Data

[63] Continuation-in-part of Ser. No. 825,144, Aug. 16, 1977, abandoned.

[30] Foreign Application Priority Data

Aug. 17, 1976 [GB] United Kingdom ............... 34246/76

[51] Int. Cl.³ .......................... F04F 1/10; F04F 1/14
[52] U.S. Cl. .................... 417/102; 417/103; 417/900; 417/125; 417/138
[58] Field of Search ............... 417/900, 103, 102, 137, 417/138, 123, 125, 145, 146, 147

[56] References Cited

U.S. PATENT DOCUMENTS

| | | | |
|---|---|---|---|
| 3,339,489 | 9/1967 | Mowbray | 417/222 |
| 3,556,682 | 1/1971 | Sakamoto et al. | 417/102 |
| 3,891,352 | 6/1975 | Tsukamoto | 417/101 |
| 3,907,462 | 9/1975 | Kroeger | 417/102 |
| 3,994,627 | 11/1976 | Calzolari | 417/317 |
| 4,037,992 | 7/1977 | Uchida et al. | 417/102 |

*Primary Examiner*—Richard E. Gluck
*Attorney, Agent, or Firm*—Weingram & Klauber

[57] ABSTRACT

A system for pumping an abrasive or corrosive fluid at high pressure and with a variable delivery rate. The system comprises raising the pressure in a non-corrosive and non-abrasive liquid in a pressure raising means comprising pump means and at least two intermediate cylinders containing floating pistons. The pressure is transferred to the abrasive or corrosive fluid in pressure transfer vessels. A valve arrangement controls the flow of non-abrasive and non-corrosive liquid to the intermediate cylinders and return means are provided for returning the floating pistons after each stroke. The valve arrangement is controlled in dependence on the positions of the floating pistons in their intermediate cylinders.

The system is particularly useful for supplying clay slurry to a high pressure plate filter press.

10 Claims, 11 Drawing Figures

FIG. I.

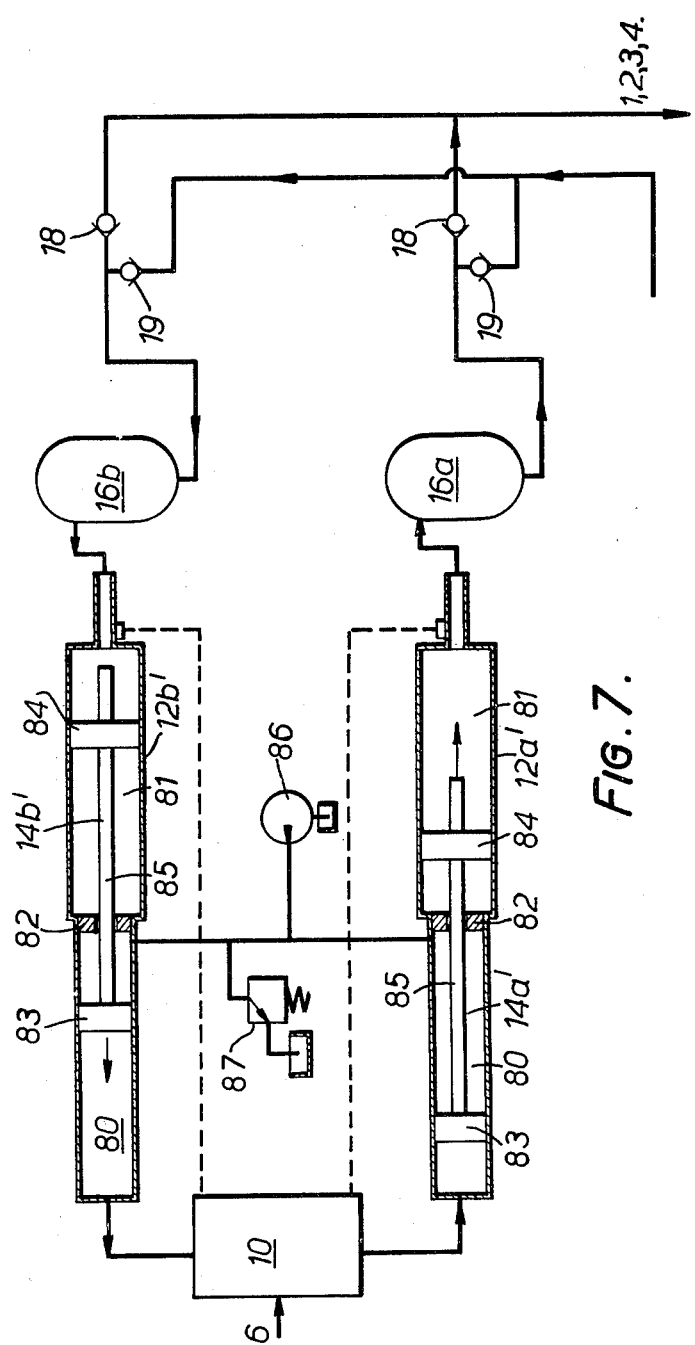

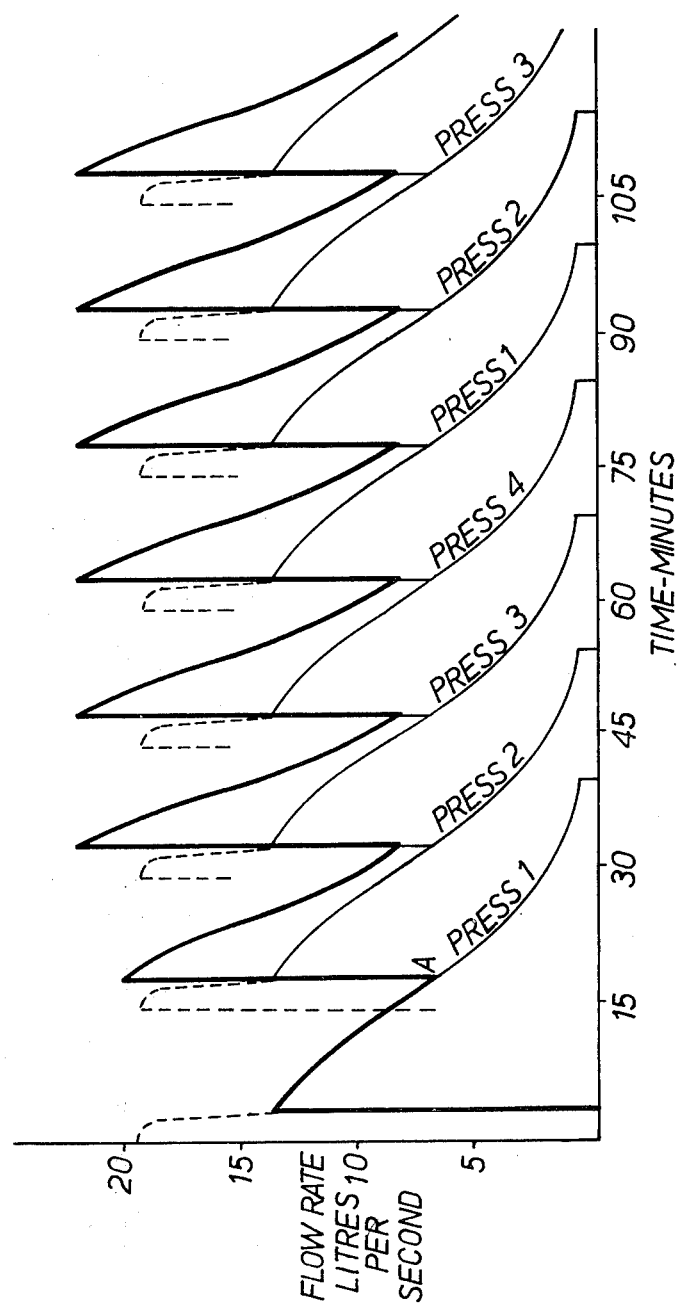

SYSTEM FOR PUMPING AN ABRASIVE OR CORROSIVE FLUID

RELATED APPLICATION

This application is a continuation-in-part of our co-pending application Ser. No. 825144, filed Aug. 16, 1977, now abandoned.

BACKGROUND OF THE INVENTION

This invention relates to a system for pumping an abrasive or corrosive fluid and, more particularly but not exclusively, is concerned with a system for pumping clay slurry into a high pressure plate filter press.

When supplying slurry to a high pressure filter press, the pumping system used must be capable of delivering slurry at high pressure, for example 1000 p.s.i., with a flow rate which is variable between zero and, for example, 30 liters per second. If slurry is pumped at such high pressures directly by a pump, the abrasive nature of the slurry leads to very rapid seal wear in the pump, and consequently maintenance costs are high. To avoid this wear, it is known to raise the pressure in oil with a reciprocating piston pump which feeds the oil, at each stroke, directly to a transfer vessel where the pressure is transferred to the slurry. On the return stroke of the piston, the oil flows back from the transfer vessel to the cylinder of the pump. This system is incapable of acting satisfactorily at flow rates below 14 liters per second.

Another prior art system is disclosed in U.S. Pat. No. 3,891,352. In that system, an intermediate fluid transmits pressure to the slurry in a transfer vessel. The intermediate fluid is pressurised by a piston which is connected to a further piston, this further piston being reciprocated by a working fluid which is directed under pressure by a changeover valve alternately to one side or the other of the further piston. The changeover valve is actuated by a sensor which is disposed in the transfer vessel and is responsive to the interface between the slurry and the intermediate fluid. This system requires two different fluids apart from the slurry to be pumped. Furthermore, leakage of fluid across the pistons can result in faulty operation.

Other systems are known which do not employ transfer vessels, but in which the fluid, for example water, in which the pressure is raised is allowed to dilute or contaminate the slurry.

SUMMARY OF THE INVENTION

According to the present invention there is provided a system for pumping an abrasive or corrosive fluid, which system comprises:

pressure-raising means, for raising a pressure in a non-abrasive and non-corrosive liquid, and pressure transfer means, for transferring said pressure to the abrasive or corrosive fluid, wherein the pressure-raising means comprises:

at least one variable-delivery pump means, at least two intermediate cylinders each having two oppositely disposed end regions, a floating piston disposed in each intermediate cylinder and movable between the respective end regions, a change-over valve assembly connected to one of the said end regions of each intermediate cylinder having means for placing that one end region alternately in communication with the pump means or with a drain, the other of said end regions of each cylinder being in communication with the transfer means, whereby when the said one end region of a said intermediate cylinder is in communication with the pump means the respective floating piston executes a forward stroke in which it is driven towards the said other of the end regions, return means for driving each floating piston towards the said one end of the respective intermediate cylinder when the said one end communicates with the drain, control means for changing-over the state of the change-over valve assembly, and sensors provided on the intermediate cylinders for actuation by the presence of the respective floating pistons at positions adjacent the sensors, the sensors being operatively connected to the control means to actuate the control means, and wherein the pressure transfer means comprises:

a respective pressure transfer vessel for each intermediate cylinder, each pressure transfer vessel having:

a first port connected to the said other of the end regions of the respective intermediate cylinder and a second port connected by a first non-return valve to an outlet for pressurized abrasive or corrosive fluid and connected by a second non-return valve to an inlet for receiving further abrasive or corrosive fluid for pressurisation.

In the system of the present invention, the pressure is raised in the non-abrasive and non-corrosive liquid, which may be oil, and transferred from that liquid directly to the abrasive or corrosive fluid. The moving parts of the pump means and of the intermediate cylinders and pistons work in the non-abrasive liquid. This avoids the high piston seal wear which would occur if these parts worked in the abrasive or corrosive fluid.

Embodiments in accordance with the present invention can pump an abrasive or a corrosive fluid at high pressures and with variable delivery without contaminating or diluting the abrasive or corrosive fluid.

In a preferred embodiment, the pump means comprises at least one axial piston pump which is capable of giving a variable delivery, down to zero delivery, at constant speed. Such a pump can be designed so that a small change in a high output pressure results in a large change in delivery flow rate.

Conveniently, the return means comprises a low pressure pump which pumps the abrasive fluid, and applies pressure to the pistons via the respective transfer vessels.

BRIEF DESCRIPTION OF THE DRAWINGS

FIG. 7 shows part of a modified form of pumping system;

FIG. 9 is a graph representing the feed requirement of a pumping system supplying four plate filter presses.

FIG. 1 shows, diagrammatically, apparatus for dewatering an aqueous clay slurry which includes four high pressure plate filter presses 1 to 4 and a pumping system for supplying slurry to the presses. The slurry may, for example, by a clay slurry of which the moisture content is to be reduced. Each plate filter press comprises, for example, 120 filter plates which are forced together under pressure while slurry is supplied to the press. The plates are shaped so that cavities are afforded between adjacent plates into which slurry is supplied. Each plate supports a filter cloth through which the liquid content of the slurry supplied to each cavity can pass, but on which the solid matter builds up to form a filter cake. When optimum filter cake deposition has occurred, the pressure is released, the plates of the press are separated and the filter cake is discharged.

Figure 1:
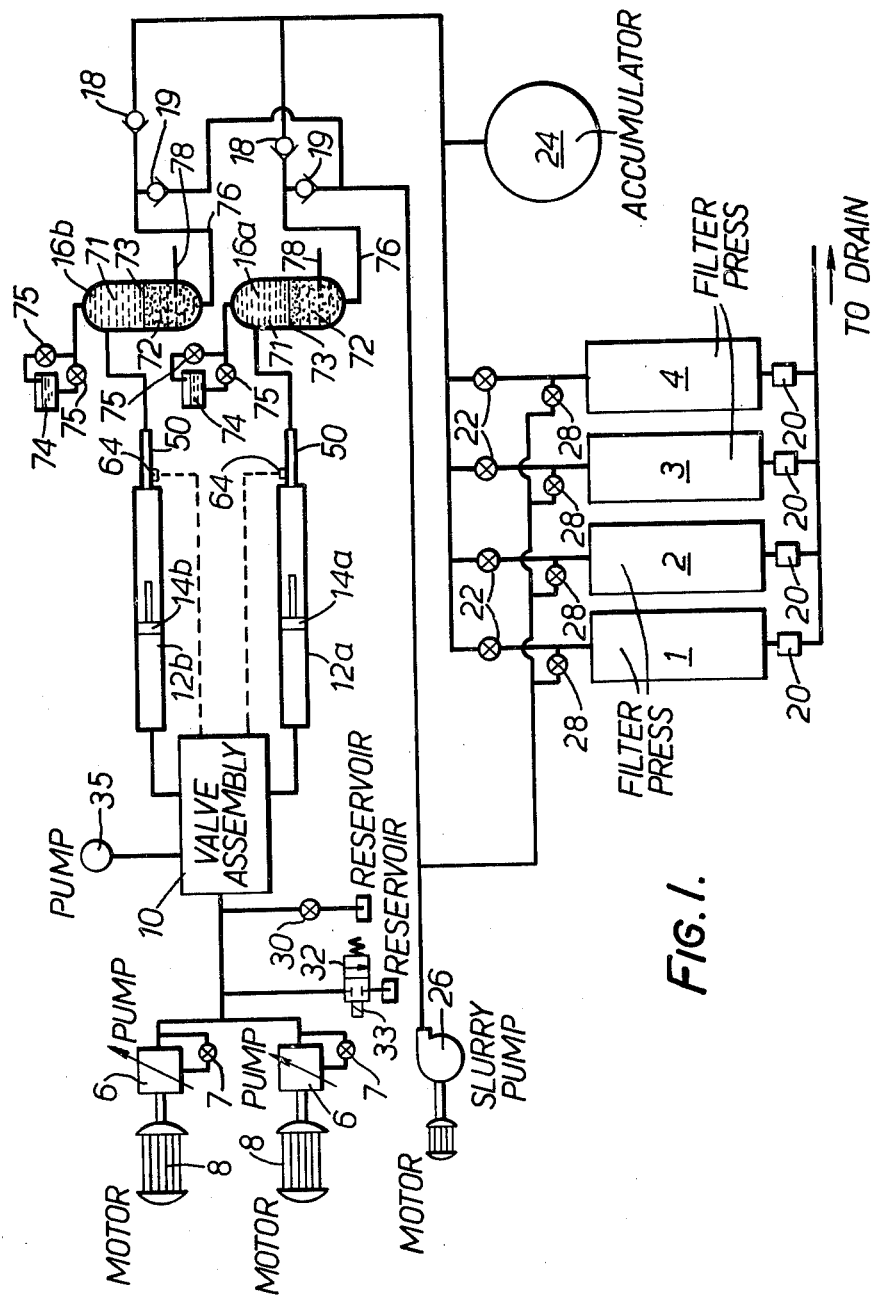
FIG. 1 shows apparatus for dewatering an aqueous slurry, including a pumping system.

The pumping system comprises pump means in the form of two high-pressure oil pumps and two intermediate cylinders, 12a and 12b. The oil pumps 6 are driven by respective fixed speed AC motors 8 and are connected, via a valve assembly incorporated in a valve block 10, to one end of each of the two intermediate cylinders 12a and 12b. The intermediate cylinders 12a and 12b contain respective floating pistons 14a and 14b. The other ends of each of the intermediate cylinders 12 are connected to the upper region of respective transfer vessels 16, the lower regions of which are connected by non-return valves 18 to the four filter presses 1 to 4. Each filter press is provided with a flow monitoring device 20 and suitable on/off valves 22. The line to the filter presses includes an accumulator 24.

A low-pressure slurry pump 26 is connected to deliver slurry at low pressure to the lower regions of the transfer vessels 16 and thus to act as return means for the pistons 14a and 14b. The pump 16 also serves initially to fill the filter presses 1 to 4, via on/off valves 28, during the first three to five minutes of the pressing cycle of each filter press.

Each pump 6 is an axial piston pump, i.e. one in which the stroke of each piston is controlled by inclining the axis of the respective cylinder relatively to the axis of the drive shaft, the angle of inclination thereby governing the output flow of the pump.

Figure 2:
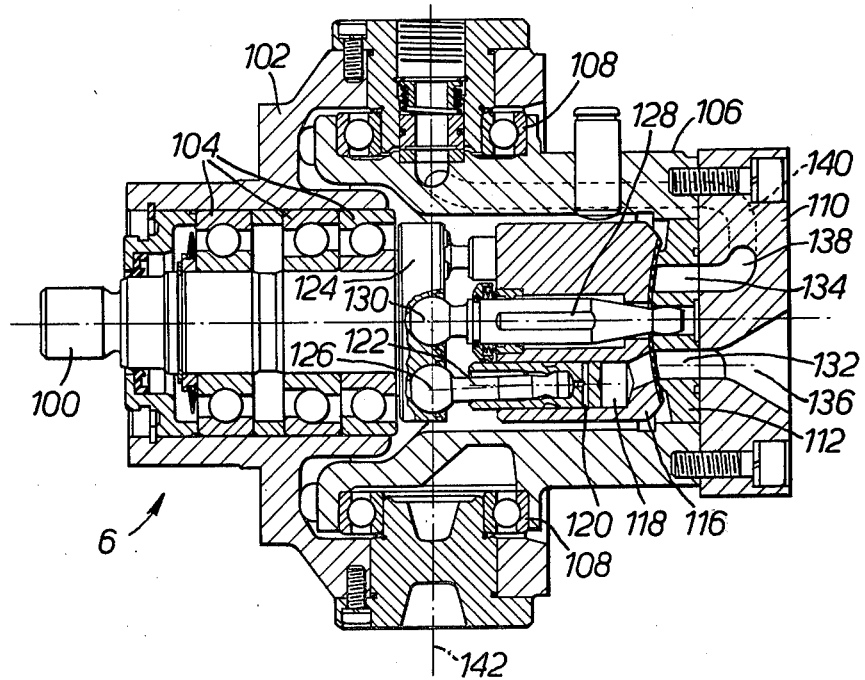
FIG. 2 shows a pump for the pumping system of FIG. 1.

A suitable pump is one manufactured by Hydromatik GmbH and designated the Variable Displacement Pump A2V, which can be supplied with a constant pressure control. Such a pump is illustrated in FIG. 2. This pump comprises a drive shaft 100 for connection to the motor 8. The drive shaft 100 is supported in a first housing part 102 by bearings 104. The first housing part 102 is connected to a second housing part 106, and the two housing parts can pivot relatively to one another by means of bearings 108. An end plate 110 is bolted to the second housing part 106, and against this end plate 110 abuts a distribution plate 112. The distribution plate 112 has a part-spherical surface which is engaged by a corresponding surface of a cylinder block 116. The cylinder block 116 has a plurality of cylinders 118 in which pistons 120 are slidable. The pistons 120 are located on piston rods 122 which are universally pivotally connected to a flange 124 on the drive shaft 100 by a ball and socket joint 126. A pilot pin 128 is also universally pivotally connected to the flange 124 by a ball and socket joint 130. This pilot pin 128 is located in an opening in the distribution plate 112 and supports the cylinder block 116.

The distribution plate 112 had kidney-shaped openings 132 and 134 which communicate with correspondingly kidney-shaped passages 136 and 138 in the end plate 110. The passage 136 opens out at the face of the end plate 110 opposite the distribution plate 112 and constitutes an inlet passage. The passage 138 leads into an outlet passage 140 which passes to the outside of the pump 6 through one of the bearings 108.

In operation, the drive shaft 100 is rotated by one of the motors 8. This causes the flange 124, the piston rods 122, the pistons 120 and the cylinder block 116 to be rotated. The housing parts 102 and 106, the end plate 110 and the distribution plate 112 do not rotate. If the cylinder block 116 is coaxial with the drive shaft 100, no pumping will take place, since the pistons 120 will not be reciprocated in their cylinders 118. However, if the second housing part 106 is turned relatively to the housing part 102 about an axis 142 provided by the bearings 108, the pistons 120 will be reciprocated during rotation and pumping will take place, fluid being drawn through the inlet passage 136 and delivered through the outlet passage 140. The stroke of the pistons 120 in the cylinders 118 depends on the angle through which the second housing part 106 is turned relative to the first housing part 102, and so the delivery of the pump can be adjusted by varying this angle.

The delivery is adjusted automatically to obtain a constant pressure by pressure compensating means which is not shown in the drawings. The pressure compensating means uses the delivery pressure, throttled by a valve 7, as a control pressure to set the angle of tilt between the two housing parts 102 and 106. When the delivery pressure is equal to a required pressure, for example 900 p.s.i., the angle of tilt will be zero. When the delivery pressure is below the required pressure, the two housing parts 102 and 106 will be turned relatively to one another until the required pressure is achieved. The pressure compensating means is constructed so that a small deviation from the required delivery rate will cause a large increase in the angle and consequently a large increase in delivery rate.

In the present embodiment, the pumps 6 are driven at a constant speed of 960 rpm and are rated at 175 HP.

A safety valve 30, set at 1000 p.s.i., and a relief/offloading valve 32, controlled by a solenoid 33, are provided.

Figure 3:
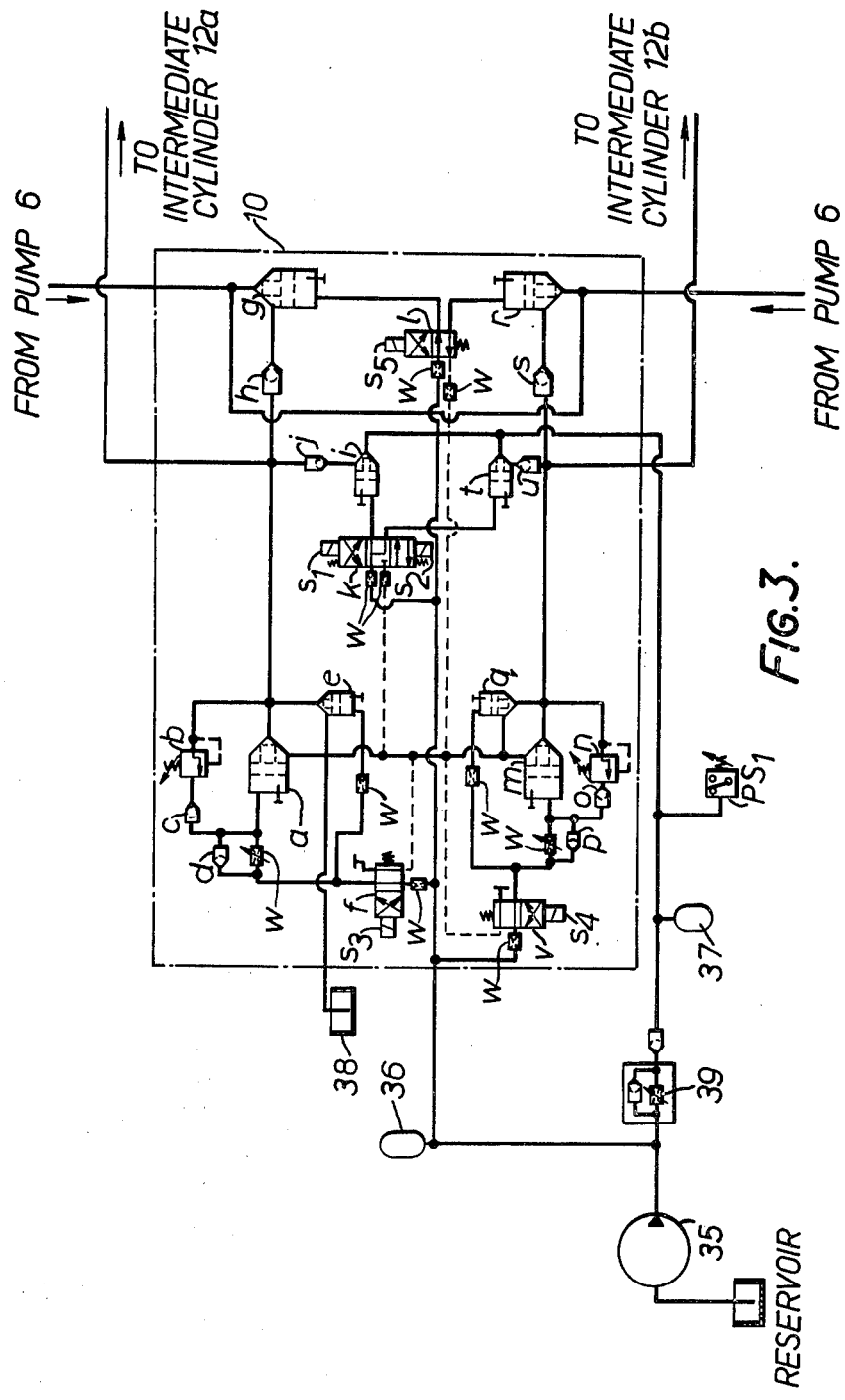
FIG. 3 shows a valve arrangement for the pumping system of FIG. 1.

The fluid circuitry of the valve assembly 10 is shown in detail in FIG. 3. The valve assembly 10 controls three distinct phases of operation of each cylinder 12: precharge, full compression, and decompression and discharge.

Precharge of the cylinders 12a and 12b is controlled by respective differential pressure valves i and t and non-return valves j and u. The valves i and t are, in turn, controlled by a three-position valve k which is operated by solenoids $S_1$ and $S_2$ and is spring-biassed towards its central position.

Full compression of the cylinders 12a and 12b is controlled by respective differential pressure valves g and r and non-return valves h and s. The valves g and r are controlled by a two-position valve l which is operated by a solenoid $S_5$.

Decompression and discharge of the cylinder 12a is controlled by two differential pressure valves a and e, a pressure relief valve b and two non-return valves c and d, the non-return valve d having a throttled by-pass orifice. The operation of these components is controlled by a two-position valve f which is controlled by a solenoid S₃. Corresponding components m, n, o, p, q, with a valve v operated by solenoid S₄ control the decompression and discharge of the cylinder 12b.

A pilot pump 35 feeds control oil to the valve assembly 10 via an accumulator 36. The pump 35 also feeds precharge oil to the valve assembly 10 via another accumulator 37 and a pressure switch PS₁. This pressure switch PS₁ is connected to supply a signal to the solenoids S₁ and S₂ to de-energise them when the pressure in the accumulator 37 drops to a predetermined value.

Figure 4:
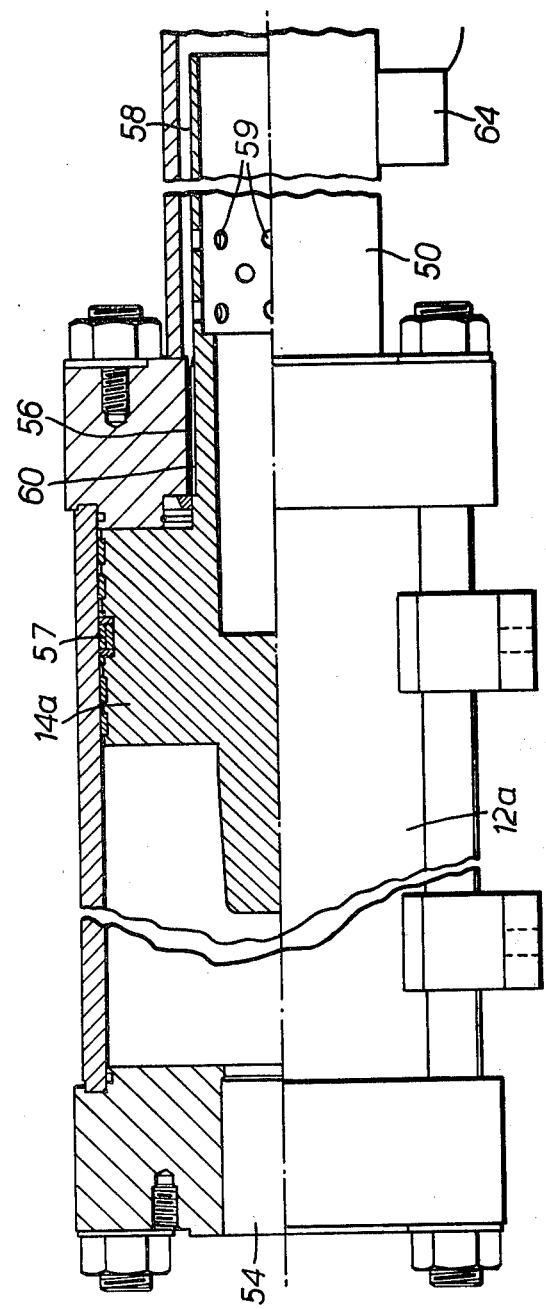
FIG. 4 is a cross-sectional view of part of the pumping system of FIG. 1.

The cylinder 12a and piston 14a are shown in FIG. 4. The cylinder 12b and piston 14b are identical. The cylinder 12a has an opening 54 at one end for connection to the valve block 10 and an opening 56 at the other end for connection to the transfer vessel 16a. The piston 14a is floating in the cylinder 12a and acts as a movable wall between the opening 54 and the opening 56. Sealing rings 57 are provided to prevent the passage of oil past the piston.

The piston 14a carries a magnetically-susceptible extension 58 which, when the piston is at the right hand end region of the cylinder 12a (as seen in FIG. 4), projects into a pipe portion 50 connecting the intermediate cylinder and pressure transfer vessel, where its presence causes actuation of a proximity switch 64. The connecting pipe portion 60 is made of a non-magnetic material so that it does not affect the operation of the proximity switch 64. The extension 58 has holes 59 and external splines 60 which allow flow of oil from the cylinder to the transfer vessel when the extension 58 projects into the pipe portion 50. The switch 64 of cylinder 12a is connected by electrical leads to the solenoids S₂, S₃, S₄ and S₅ of the valve block 10 so that when it is actuated it causes the solenoids S₂ and S₃ to become energised and solenoids S₅ and S₄ to be deenergised, but the corresponding switch 64 of cylinder 12b is connected by electrical leads to the solenoids S₁, S₄, S₅ and S₃ so that when it is actuated it causes the solenoids S₁, S₄ and S₅ to become energised and S₃ to be de-energised.

Figure 5:
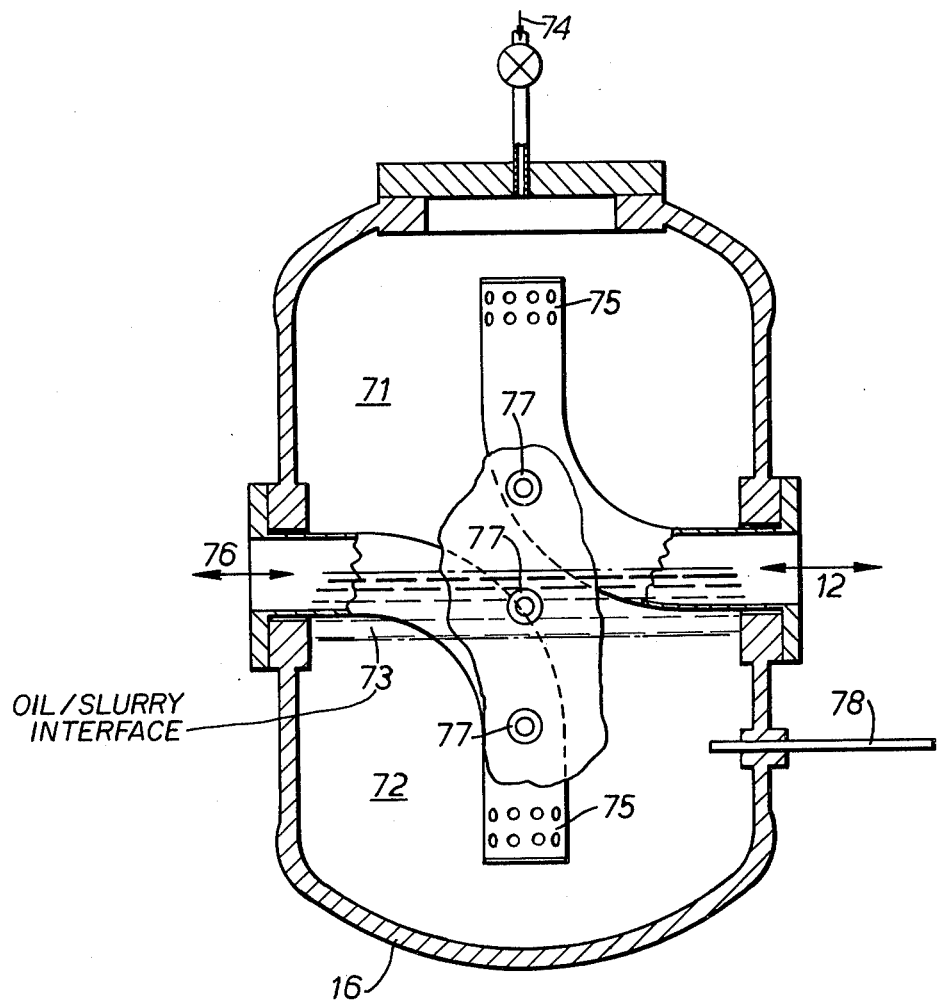
FIG. 5 is a cross-sectional view of another part of the pumping system of FIG. 1.

Each transfer vessel 16 is generally cylindrical and is disposed with its axis vertical, as shown in FIG. 5. Each transfer vessel 16 contains oil 71 in its upper region which floats on slurry 72 contained in the lower region. The oil and slurry are supplied to and discharged from the transfer vessels 16 through feed pipes 75 and meet at an oil/slurry interface 73. As shown, this interface is not a plane of infinitely small width, but it is a band of finite width in which the oil and slurry are diffused into one another. Holes in the feed pipes 75 are provided to reduce turbulence. An oil header tank 74 is connected through manually operable valves 75 to the upper region of each transfer vessel. A slurry outlet pipe 76 connects each transfer vessel with the respective non-return valve 18. A conductivity probe 78 is disposed in the lower region of each transfer vessel. As a further precaution against oil contamination of the slurry, samples of the contents of the transfer vessel can be tapped off for analysis at different levels through ports 77.

During operation of the above-described pumping system, the pumps 6 supply high-pressure oil to one or the other, or both, intermediate cylinders 12a or 12b. The cylinders thus operate alternately as governed by the valve block 10. As oil is supplied through the opening 54 of a cylinder, the piston is moved to the right as seen in FIGS. 4 and 6 and oil is discharged through the opening 56 to the transfer vessel 16 to which the cylinder is connected. The volume of oil discharged to a transfer vessel at each stroke of the respective piston 14 is about 32 gallons. For each stroke of each piston 14, therefore, 32 gallons of slurry are discharged from the respective transfer vessel 16 and fed to the or each filter press which is being supplied at that moment.

At the end of each stroke, the pressure of the oil in the respective cylinder 12 is relieved and the pistons 14 are returned to the left-hand end of their respective cylinders 12 by the pressure of slurry delivered by the pump 26 through non-return valves 19, this pressure acting through the transfer vessel 16. The oil thus discharged through the opening 54 of the respective cylinder 12 is conveyed to a drain 38 which in practice is a tank supplying the input oil for the pumps 6.

The cylinder or cylinders to which oil is being supplied at any time is determined by the condition of the valve block 10, which in turn is governed by the switches 64 on the cylinder 12 and by the pressure switch PS1. A cycle of operation of the valve block 10 will now be described in detail with reference to FIG. 3.

Figure 6A:
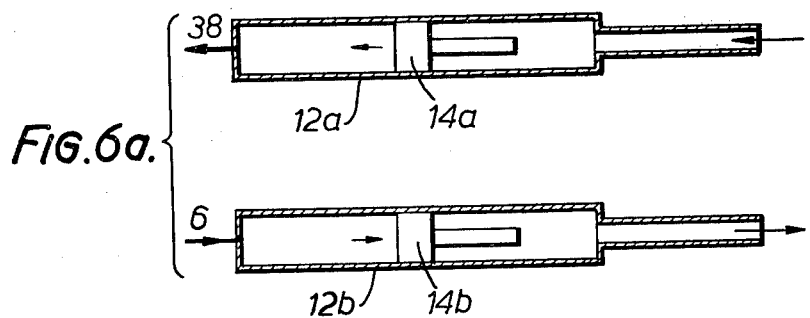
FIGS. 6a to 6c show a part of the pumping system of FIG. 1 at three different times during a pumping cycle.
Figure 6B:
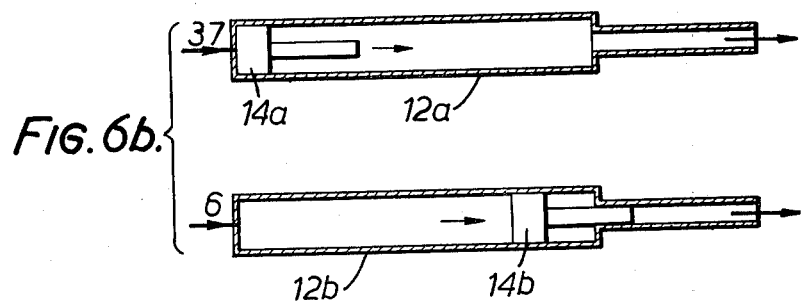

The cycle will be described from the time at which the cylinder 12a is discharging and the cylinder 12b is undergoing full compression, as shown in FIG. 6a. Under these conditions, the solenoid S₃ is energised and the solenoids S₁, S₂, S₄ and S₅ are de-energised. Because of this, the valves a and e are open, allowing oil from the cylinder 12a to be discharged to the drain 38. The valves m and q are closed by oil from the pump 35 passing through the valve v, whereas the valve r is open to allow oil from the pumps 6 to flow into the cylinder 12b. The valve g is closed by oil from the pump 35, as are both the precharge valves i and t.

As the cylinder 12b approaches the end of its stroke, the extension shaft 58 actuates the switch 64. The resulting signal causes the solenoids S₁, S₄ and S₅ to be energised, and the solenoid S₃ to be de-energised, by means of relays the design of which is well within the capability of the skilled man. This gives rise to the following sequence of events:

| | | |
|---|---|---|
| Valves a and e are held closed | 0.01 | seconds |
| Valve i opens | 0.05 | seconds |
| Valve q opens | 0.2 | seconds |
| Valve r closes | 0.2 | seconds |
| Valve g opens | 0.3 | seconds |

The times given are the elapsed times from the actuation of the switch 64, and these delays result from the throttling effect of elements W of the fluid circuit in the valve block 10.

Figure 6C:
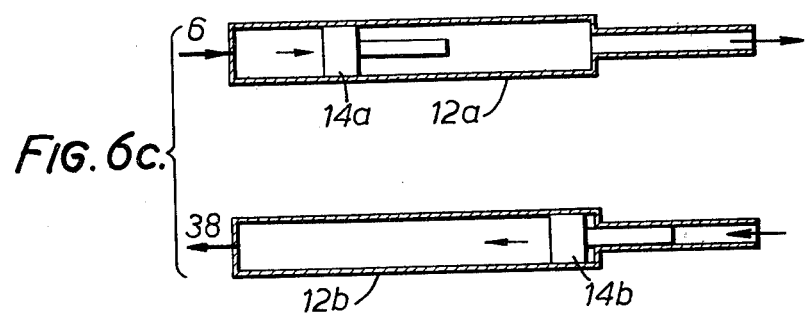

The closure of the valves a and e discontinues the discharge of oil from the cylinder 12a. When valve i opens, precharge oil is fed from the accumulator 37 to the cylinder 12a to build up the oil pressure in that cylinder and to begin the forward stroke of the piston 14a while the piston 14b is still completing its forward stroke (FIG. 6). The flow of oil from the pump 35 is governed by a throttle valve 39, and this flow does not keep up with the oil flow out of the accumulator 37, and so the pressure in this accumulator falls. Meanwhile, the closure of valve r has shut off the supply of oil to the cylinder 12b, and the opening of the valve q allows oil to be discharged from the cylinder 12b to the drain 38. At the same time the pressure exerted by the oil in the cylinder 12b causes the relief valve n to open, and this pressure then acts on the valve m; holding it shut. This condition is shown in FIG. 6c. Eventually, after approximately 0.3 seconds, the pressure in the cylinder 12b falls below, for example, 200 p.s.i., which allows the relief valve n to close, so allowing the valve m to open. The remainder of the oil in the cylinder 12b is thus rapidly discharged through both the valves m and q. The progressive relief of pressure caused by this arrangement avoids damaging pressure surges.

The opening of the valve g causes the oil from the pumps 6 to be supplied to the cylinder 12a, which then begins its full compression. Approximately 0.35 seconds after the actuation of the switch 64, the pressure in the accumulator 37 has fallen far enough to cause the switch PS1 to be actuated, so de-energising the solenoid $S_1$ by means of a suitable relay. The valve k then returns to its central position and the valve i closes, ending the precharge of the cylinder 12a.

When the cylinder 12b is fully retracted so that no further pressure is applied from that cylinder on the valves m and q, these valves close under spring force.

When the extension shaft 58 of the piston 14a actuates the respective proximity switch 64, the solenoids $S_4$ and $S_5$ are de-energised and the solenoids $S_2$ and $S_3$ are energised by means of suitable relays. This causes the following sequence of events:

| | | |
|---|---|---|
| Valves m and q are held closed | 0.01 | seconds |
| Valve t opens | 0.05 | seconds |
| Valve e opens | 0.2 | seconds |
| Valve g closes | 0.2 | seconds |
| Valve r opens | 0.3 | seconds |

The cycle then proceeds as first described except that now it is the cylinder 12b which undergoes precharge and begins full compression while the cylinder 12a decompresses and discharges, thus beginning a new cycle.

The delivery rate of the slurry pump 26 is greater than the maximum delivery rate of the pump 6, so that the return speed of the pistons 14 is always greater than their outward speed. Thus each piston 14 is always ready to begin its next stroke when the shaft 58 of the other piston triggers the associated proximity switch 64.

A precaution against oil contamination of the slurry is provided by the conductivity probe 78. The probe 78 of each transfer vessel 16 is normally immersed in the slurry 72. However, should the oil/slurry interface 73, which normally moves about 6" with each piston stroke, fall below a specified level due, for example, to leakage, the probe 78 will become immersed in oil. Activation of the probe 78, by contact with oil, causes the axial piston pump motors to stop and gives a visible alarm signal. As a further precaution against oil contamination of the slurry, a dead-leg, not included in the embodiment described, could be incorporated in each pipe 76.

FIG. 7 shows part of a modified form of pumping system. In this modified form, the low pressure slurry pump 26 is dispensed with. The interiors of the cylinders 12a' and 12b' are each divided into two chambers 80 and 81 which are separated from each other by a wall 82. Each piston 14 has two heads 83, 84 interconnected by a rod 85. Each head 83 is in the respective chamber 80 and each head 84 is in the respective chamber 81. The rods 85 pass through holes in the walls 82, and seals are provided to prevent leakage across the walls 82.

The chambers 80 are interconnected at their ends nearer the walls 82. A small volume hydraulic pump 86 feeds the line inter-connecting the chambers 80, which line is also provided with a spill valve 87.

The chambers 81 are open to the atmosphere at their ends nearer the walls 82.

In operation, when the piston 14a' is on its forward stroke, as indicated by an arrow, the head 83 of the piston 14a' forces oil from the chamber 80 of the cylinder 12a' into the chamber 80 of the cylinder 12b' to return the piston 14b' before its next forward stroke. This flow of oil is supplemented by a small amount by the pump 86 to ensure that the piston 14b' is ready for its next forward stroke before the piston 14a' finishes its forward stroke. The spill valve 87 discharges the excess oil which builds up in the system due to the pump 86. The slurry feed to the non-return valves 19 is no longer pumped; instead it is supplied directly from a feed tank with a nominal head.

In the modification of FIG. 7, the inter-connection between the chambers 80, and the pumps 86, afford the return means for the pistons 14a' and 14b'.

Figure 8:
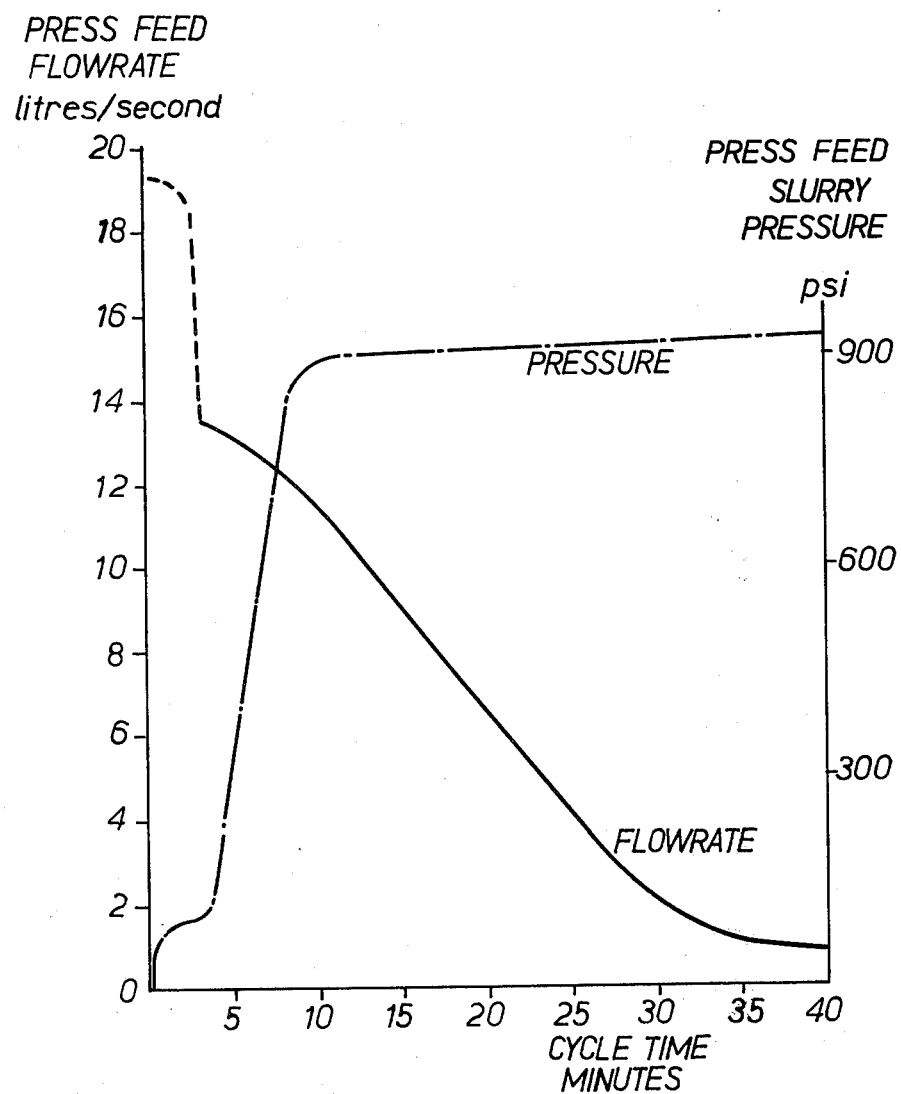
FIG. 8 is a graph representing the variation with time of the flow rate and the pressure of slurry fed to a plate filter press during a typical pressing cycle.

FIG. 8 represents variations with time in the flow rate and the pressure of a slurry fed to an individual plate filter press during a typical pressing cycle. Initially slurry is supplied by the low pressure pump 26 through the valves 28 to fill the cavities of the filter press, as indicated by the dashed portion of the flow rate curve. The pump 26 delivers slurry at the maximum delivery pressure of the pump 26, this pressure being 60-80 p.s.i.—sufficient only to overcome the resistance to flow of the slurry into the cavities of the filter press. As soon as the cavities are full and the pump 26 is called upon to force the liquid content of the slurry through the filter cloths in the filter press, the flow rate falls suddenly, the low pressure pump 26 being unable to maintain the initial high flow rate of about 20 liters/second, and the flow rate drops rapidly, as the slurry feed pressure levels off at about 60-80 p.s.i.

After the press has been supplied by the pump 26 for about three minutes, a timer actuates the opening of the valve 22 and the closure of the valve 28 of that press. Opening the valve 22 allows high pressure slurry into the press.

The slurry feed pressure rapidly increases to about 900 p.s.i., the pumps 6 operating at maximum delivery. The flow rate drops only relatively slowly, due to continued filter cake deposition. From then on for the rest of the cycle, the pressure increases slowly, but the flow rate falls off relatively rapidly due to the variation in the angle of inclination of the cylinders of the pumps 6 as a function of the delivery pressure.

FIG. 9 represents the situation where four filter presses, each operating on a cycle similar to that represented in FIG. 8, are supplied by the same pumping system. Apart from the first cycle of press 1 each cycle is begun before the preceding cycle or cycles have finished. Again, as represented in FIG. 9 by dashed lines, each press is supplied with slurry by the low pressure slurry pump 26 for the first three minutes of each cycle.

It will be appreciated that at point A on FIG. 9, when the high pressure pumping system begins to supply slurry to press 2, the delivery requirement of the pumping system will suddenly increase, because the system must supply not only the initial requirement of press 2, but also the residual requirement of press 1. Similarly, when press 3 begins to receive slurry from the high pressure pumping system, the system must supply the initial requirement of press 3 and the residual requirements of presses 1 and 2. The actual delivery requirement therefore fluctuates, as shown by the thick line in FIG. 8, between about 8 and about 21 liters/second, after the first two cycles. This fluctuating delivery requirement is met by altering the angle of inclination of the cylinders of the pumps 6 in response to the varying pressure of the oil delivered by the pumps 6.

Although the present invention has been described with reference to a specific embodiment having four filter presses supplied by two pumps 6, it will be appreciated that more or fewer filter presses could be supplied by the pumping system, with the number and size of the pumps depending on the maximum feed requirement of the filter presses. The size of the intermediate cylinders could also be altered. Furthermore, more than two intermediate cylinders and respective transfer vessels could be used, with the valve assembly 10 suitably modified. For example, each cylinder 12 and piston 14 could be replaced by two or more cylinder and piston units operating in unison. This would achieve a greater total volume of oil fed at each stroke without the expense of constructing larger cylinders and pistons.

In the comparatively rare case where the specific gravity of the oil is greater than that of the slurry being fed, it will be realised that the slurry will float on the oil and the transfer vessel will therefore need to be inverted.

While the proximity switches 64 which have been described are preferred, other forms of switch could be used, for example magnetic switches which are actuated by respective permanent magnets carried by the extensions 58 of the pistons 14.

Also, the energisation and de-energisation of the solenoids of the solenoid-operated valves could be effected by means different from those described. In one alternative construction, the pressure switch PS1 is dispensed with, and the proximity switches 64 serve only to energise the solenoids $S_1$ and $S_2$, by means of relays, at the appropriate times and to activate timers. These timers then control the remaining operations of the solenoids. Thus activation of the proximity switch 64 of the cylinder 12b causes solenoid $S_3$ to be de-energised and solenoid $S_1$ to be energised. The accumulator 37 then discharges into the cylinder 12a which becomes precharged. After a time, for example, 0.5 second as governed by a timer, the solenoid $S_1$ is de-energised and the solenoids $S_4$ and $S_5$ become energised. The cylinder 12a is then subjected to the full pressure of the pumps 6 and moves forward. The cylinder 12b meanwhile returns. When the proximity switch 64 on cylinder 12a is actuated the solenoid $S_4$ is de-energised, and the solenoid $S_2$ is energised, and the cylinder 12b is precharged. After a time, for example 0.5 second, the solenoids $S_2$ and $S_5$ are de-energised and the solenoid $S_3$ is energised. The cylinder 12b then moves forward.

We claim:

1. A system for pumping an abrasive or corrosive fluid, which system comprises:
   pressure-raising means, for raising a pressure in a non-abrasive and non-corrosive liquid, and
   pressure transfer means, for transferring said pressure to the abrasive or corrosive fluid, wherein the pressure raising means comprises:
   at least one variable-delivery pump means,
   two intermediate cylinders each having
   two oppositely disposed end regions,
   a floating piston disposed in each intermediate cylinder and movable between the respective end regions,
   a change-over valve assembly connected to one of the said end regions of each intermediate cylinder and having means for placing that one end region alternately in communication with the pump means or with a drain, the other of said end regions of each cylinder being in communication with the transfer means, whereby when the said one end region of said intermediate cylinder is in communication with the pump means the respective floating piston executes a forward stroke in which it is driven towards the said other of the end regions,
   return means for driving each floating piston towards the said one end of the respective intermediate cylinder when the said one end communicates with the drain,
   control means for changing-over the state of the change-over valve assembly, the control means being adapted to cause the said pistons to reciprocate out of phase with each other with each of the pistons beginning its forward stroke before the other piston completes its forward stroke, and
   sensors provided on the intermediate cylinders for actuation by the presence of the respective floating pistons at positions adjacent the sensors, the sensors being operatively connected to the control means to actuate the control means, and wherein the pressure transfer means comprises:
   a respective pressure transfer vessel for each intermediate cylinder, each pressure transfer vessel having:
   a first port connected to the said other of the end regions of the respective intermediate cylinder and
   a second port connected by a first non-return valve to an outlet for pressurized abrasive or corrosive fluid and connected by a second non-return valve to an inlet for receiving further abrasive or corrosive fluid for pressurization.

2. A system as claimed in claim 1, in which the pump means comprises at least one axial piston pump.

3. A system as claimed in claim 2, in which pressure compensating means are provided for the pump means.

4. A system as claimed in claim 1, in which each sensor comprises a proximity switch provided on the respective intermediate cylinder and actuable by the respective piston when that piston reaches a predetermined position within the cylinder.

5. A system as claimed in claim 1, in which the change-over valve assembly comprises at least one solenoid operated change-over valve, the supply of current to the solenoid means of the change-over valve being controlled by the proximity switches.

6. A system as claimed in claim 4, in which each piston has a magnetically susceptible extension which causes actuation of the respective proximity switch.

7. A system as claimed in claim 1, in which means are provided whereby the return stroke of each piston is completed more rapidly than the forward stroke.

8. A system as claimed in claim 1, in which the return means comprises a low pressure pump which supplies the further abrasive or corrosive fluid to the second port of each transfer vessel.

9. A system as claimed in claim 1, in which the interior of each intermediate cylinder is divided into two chambers by a wall and each piston comprises two heads interconnected by a rod which extends through the wall of the respective cylinder, a chamber of one of the cylinders being connected to a chamber of the other cylinder whereby a forward stroke of one piston causes fluid to be displaced between the interconnected chambers to cause the reverse stroke of the said other piston.

10. A system as claimed in claim 9, in which a pump is provided to supplement the flow of fluid between the chambers, and in which a spill valve is provided to discharge excess fluid.

* * * * *